US009149757B2

(12) United States Patent
Oddo

(10) Patent No.: US 9,149,757 B2
(45) Date of Patent: Oct. 6, 2015

(54) CALCIUM LSX AND LITHIUM H-LSX ZEOLITE OXYGEN ENRICHMENT SYSTEM FOR AN INTERNAL COMBUSTION ENGINE

(71) Applicant: Nicholas Leonard Oddo, Wake Forest, NC (US)

(72) Inventor: Nicholas Leonard Oddo, Wake Forest, NC (US)

(73) Assignee: Oddomotive, Inc., Wake Forest, NC (US)

( * ) Notice: Subject to any disclaimer, the term of this patent is extended or adjusted under 35 U.S.C. 154(b) by 81 days.

(21) Appl. No.: 14/028,416

(22) Filed: Sep. 16, 2013

(65) Prior Publication Data

US 2014/0202335 A1    Jul. 24, 2014

Related U.S. Application Data

(60) Provisional application No. 61/726,508, filed on Nov. 14, 2012.

(51) Int. Cl.
  *B01D 53/047*    (2006.01)
  *B01J 20/18*    (2006.01)

(52) U.S. Cl.
  CPC .............. *B01D 53/0476* (2013.01); *B01J 20/18* (2013.01); *B01D 2253/108* (2013.01); *B01D 2256/12* (2013.01); *B01D 2257/102* (2013.01); *B01D 2259/455* (2013.01)

(58) Field of Classification Search
  CPC ...................... B01D 2253/108; B01D 2256/12; B01D 2257/102; B01D 2259/455; B01D 53/0476; B01J 20/18
  See application file for complete search history.

(56) References Cited

U.S. PATENT DOCUMENTS

| | | | |
|---|---|---|---|
| 3,961,609 A * | 6/1976 | Gerry | 123/567 |
| 5,152,813 A | 10/1992 | Coe et al. | |
| 5,593,480 A | 1/1997 | Poschl | |
| 5,649,517 A | 7/1997 | Poola et al. | |
| 5,656,066 A | 8/1997 | Reiss et al. | |
| 5,678,526 A * | 10/1997 | Cullen et al. | 123/690 |
| 5,908,023 A | 6/1999 | Stutzenberger | |
| 5,960,777 A * | 10/1999 | Nemser et al. | 123/585 |
| 6,363,923 B1 | 4/2002 | Pletschacher | |
| 6,543,428 B1 | 4/2003 | Blandino et al. | |
| 6,640,794 B2 | 11/2003 | Weber | |
| 6,722,352 B2 | 4/2004 | Smolarek et al. | |
| 6,761,155 B2 * | 7/2004 | Livingston et al. | 123/585 |
| 6,895,945 B2 | 5/2005 | Parsa | |
| 7,128,064 B2 | 10/2006 | Heider | |
| 7,318,858 B2 * | 1/2008 | Parsa | 96/60 |
| 7,337,770 B2 | 3/2008 | Moon | |
| 8,176,884 B2 | 5/2012 | Tewari et al. | |

* cited by examiner

Primary Examiner — Christopher P Jones

(57) ABSTRACT

A system for increasing the power and efficiency of engines by increasing the oxygen content in the intake manifold supply using a zeolite filtration system. This system converts the air to a higher oxygen content as it flows to the intake manifold in an engine. The practical idea of this is to increase the power of the engine without increasing displacement, while almost completely diminish NOx emissions as well as reducing fuel consumption. In this invention there are three main components: the zeolite filtration oxygen enrichment system, a system for desorbing nitrogen within the filter when the engine is off or idle, and a wastegate for controlling oxygen enrichment or no oxygen enrichment.

10 Claims, 2 Drawing Sheets

CALCIUM LSX AND LITHIUM H-LSX ZEOLITE OXYGEN ENRICHMENT SYSTEM FOR AN INTERNAL COMBUSTION ENGINE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is in the technical field of internal combustion engines. More particularly, the present invention is in the technical field of oxygen enrichment.

Conventional oxygen enrichment systems are typically bulky and expensive in order to achieve the level of oxygen content that would make it feasible for use in an internal combustion engine. This is because it is necessary to strip out large amounts of nitrogen content from the incoming airstream to achieve higher levels of pure oxygen. Further, it is not uncommon that the airflow needs to be accelerated to obtain the necessary levels of oxygen. Further, in an internal combustion engine only the displacement of the engine is the volume of air in the pistons at one time. Only $1/5^{th}$ of the air is useable oxygen and therefore the other $4/5^{th}$ is wasted displacement needed for the engine to accomplish work. Further, by increasing the oxygen content we can have smaller engines accomplish the same amount of work as much larger engines. Further, achieving the necessary levels of oxygen would improve the efficiencies of the internal combustion engine.

SUMMARY OF THE INVENTION

The present invention is a zeolite oxygen enrichment system for an internal combustion engine using Calcium LSX and Lithium-H-LSX.

DETAILED DESCRIPTION OF THE INVENTION

Figure 1:
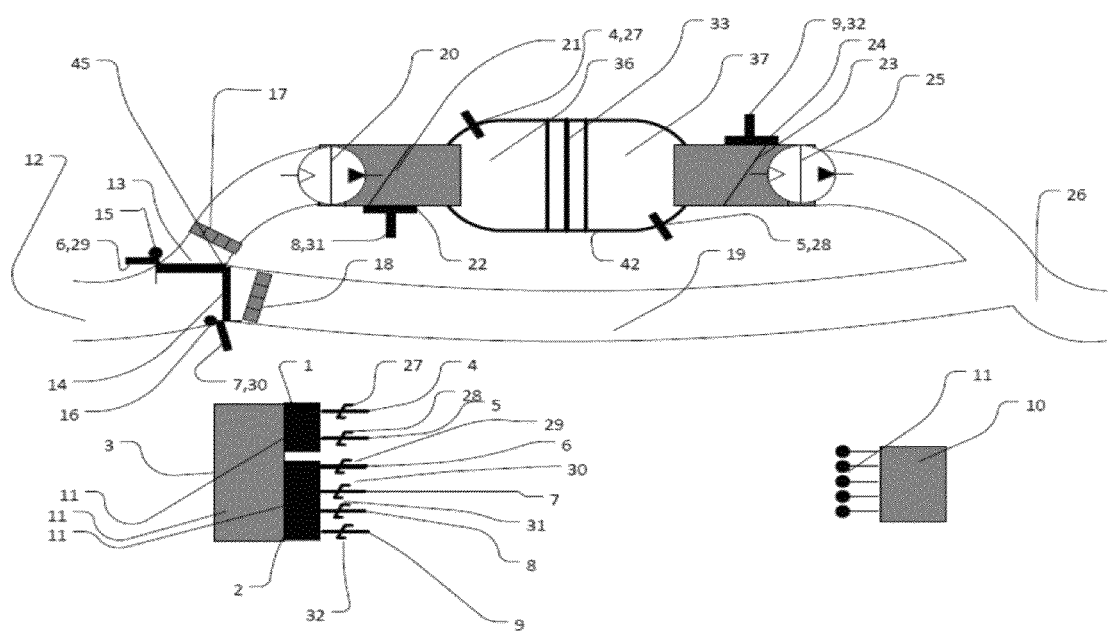
FIG. 1 is a perspective view of all the system components of the present invention.
Figure 2:
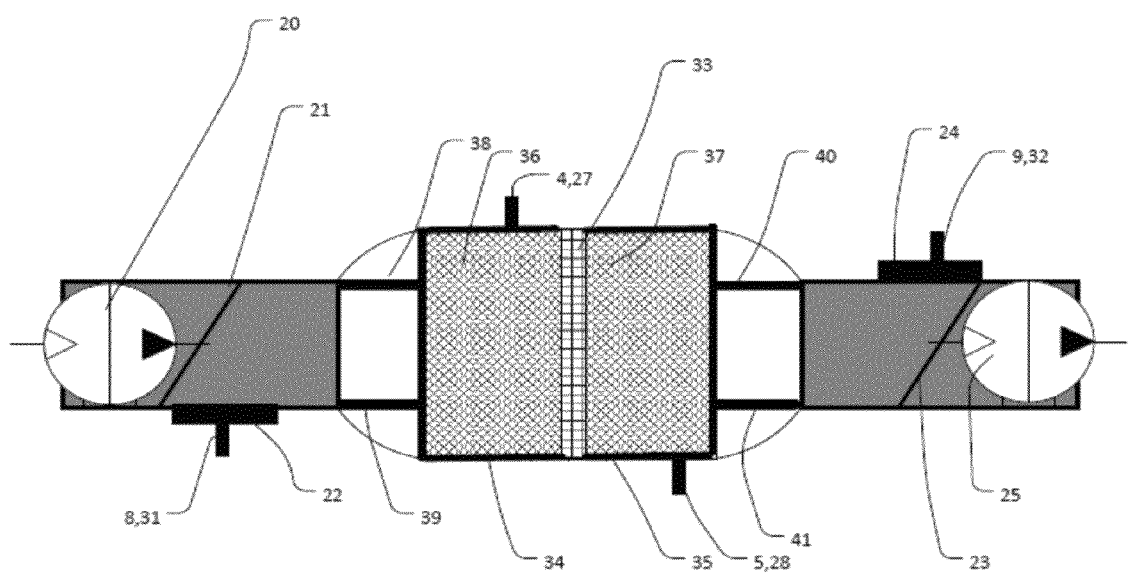
FIG. 2 is a side view of the zeolite container of the present invention.

Referring now to the invention in more detail, in FIG. 1 and FIG. 2 there is shown [1] a high pressure vacuum pump for two vacuum tubes that absorb the nitrogen from the zeolite filter when the engine is off or idle. [2] A low pressure vacuum for the vacuum tubes for the opening and closing of slide action valves in this design. [3] The electric or mechanical motor for powering the high pressure vacuum pump and the low pressure vacuum pump. [4] First high pressure vacuum tube for nitrogen cleaning system. [5] Second high pressure vacuum tube for nitrogen cleaning system. [6] First low pressure vacuum tube for the vacuum switch for the first slide action valve. [7] Second low pressure vacuum tube for the vacuum switch for the second slide action valve. [8] Third low pressure vacuum tube for the vacuum switch for the third slide action valve. [9] Fourth low pressure vacuum tube for the vacuum switch for the fourth slide action valve. [10] ECU (engine control unit. [11] Wire connections for the on/off sensor and switch for the vacuum tubes, which are connected to the ECU. [12] Intake manifold supply [13] First slide action valve. [14] Second slide action valve. [15] First valve actuator. [16] Second valve actuator. [17] Intake particle filter. [18] Bypass particle filter. [19] Intake pipe for no oxygen enrichment. [20] First electronic supercharger. [21] Third slide action valve. [22] Third valve actuator. [23] Fourth slide action valve. [24] Fourth valve actuator. [25] Second electronic supercharger. [26] Final intake pipe. [27] First on/off sensor for the first high pressure vacuum tube. [28] Second on/off sensor for the second high pressure vacuum tube. [29] First on/off sensor for the first low pressure vacuum tube. [30] Second on/off sensor for the second high pressure vacuum tube. [31] Third on/off sensor for the third low pressure vacuum tube. [32] Fourth on/off sensor for the fourth low pressure vacuum tube. [33] Mesh divider for the two zeolite cartridges. [34] First U-shaped piece of material to hold the two zeolite cartridges together. [35] Second U-shaped piece of material to hold the two zeolite cartridges together. [36] Calcium-LSX zeolite rectangular cartridge. [37] Lithium-H-LSX zeolite rectangular cartridge. [38] First support for the zeolite cartridges in the container. [39] Second support for the zeolite cartridges in the container. [40] Third support for the zeolite cartridges in the container. [41] Fourth support for the zeolite cartridges in the container. [42] Container for zeolite cartridges. [43] Power distributor for electric motor to the high pressure vacuum pump and/or the low pressure vacuum pump. [44] Control sensor for power distributor from the electric motor. [45] Wastegate.

Referring now to the invention in more detail in FIG. 1, the following are the steps necessary for oxygen enrichment to occur within an internal combustion engine. The first step is for air to go through the intake manifold supply [12], then there will be a side-action valve [13] then a particle filter [17], and then the air is pressurized to 15-30 psi via any forced induction method, but in this invention the primary choice will be an electronic supercharger [20 and 25] due to its low cost and low complexity. Then there is a lithium-H-LSX (low silica content) zeolite filter [37] and a Calcium-LSX zeolite filter [36] that will filter out nitrogen and other gases. These particular types of zeolites are used due to their ability to absorb the most nitrogen in tests, typically up to 85%. This zeolite filter is connected to the intake manifold supply [12] which by then should oxygen content will be between 60-90% depending on the quality of the filter and the amount of use. Half of the zeolite filter would be made of lithium-H-LSX [37] and the other half would be made of a calcium LSX zeolite filter [36]. Two different types of zeolite are used due to the nature that when combined Lithium-H-LSX and Calcium LSX zeolite have higher nitrogen selectivity than they would individually as shown in certain studies. In the Lithium-H-LSX, there will be a large amount of Li+ cations and some H+ cations because Lithium-LSX's have higher nitrogen selectivity when there is a high lithium concentrations. According to prior art scientific literature, when Li+ and H+ co-exchanged LSX zeolites (Li-H-LSX) with various ratios of Li+ and H+ were prepared, it was found that Lithium-H-LSX has a slightly higher nitrogen selectivity than regular Lithium-LSX zeolites. This is why LSX is used, because it would make higher lithium content possible. This same principles is also applicable with calcium. Not only that, lithium zeolites are expensive making practical to also use another cheaper zeolite (like Calcium-LSX zeolite) without sacrificing nitrogen selectivity. In general, LSX zeolite (low silica content zeolites), which are known for their high nitrogen selectivity and that's the reason only LSX zeolites are used. Behind the zeolite filtration system container, there is a slide action valve [21] and in front is another slide action valve [23]. After this, there is another electronic supercharger [25] (or any forced induction device that will pressurize the air) because of pressure loses from the filter once the air exits the filter to maintain airflow.

An important question to think about is why you need to pressurize the air before it enters the zeolite filter and after it exits. This is an important question because of the one negative fact that this filter will slow down the speed of the air to the intake manifold supply [12] resulting in less airflow. Unfortunately, forced induction is needed immediately when air enters the engine. Now, with cars that already have turbochargers, this is not really a problem because turbochargers are driven by exhaust gas and will increase the pressure of the air anyway, not needing any additional forced induction device after the zeolite filtration system if you have the turbocharger. Better yet, electronic superchargers are simple and easy to install in most cars. You can just change the design of the duct work or place the zeolite filter very close to the air valve. This new oxygen enrichment system invention that I created however can theoretically increase power more than forced induction because at higher than standard pressure air, forced induction can cause knock. This technology does not cause knock because the air itself does not increase temperature. Higher pressure however allows for more air to flow through the zeolite filter and not have slowed down by the time it passes through, which is why you need forced induction before the air enters the zeolite filter. For a turbocharger or any other forced induction device to get the same performance as this oxygen enrichment system would at 80% oxygen at 1 atmosphere (standard air pressure) (12 psi), a turbocharger using regular air at 20% oxygen would have to pressurize the air to 48 psi. Most forced induction devices cannot provide this kind of psi boost unless the engines are extremely powerful, high quality, and use expensive forced induction devices and expensive engines. 36 psi boost is nearly impossible in the average car, which usually accomplishes less than 10 psi of boost. Not only that, combining forced induction and oxygen enrichment would make the power gains a lot higher than each individually. The zeolite filter will be encased in metal or plastic along with metal or plastic pipes. If you use the oxygen enrichment system, which increases the oxygen content to 80%, and then pressurize it to 24 psi (double standard air pressure), this invention could allow the engine to be 8 times as powerful as without it, or you could have an engine $\frac{1}{8}^{th}$ the size produce the same power.

In more detail, referring to the invention of FIG. 2 of the zeolite filtration oxygen enrichment system comprises the zeolite container [42]. This is that there is a container with the zeolite filters in it. As previously mentioned, there are two zeolites used, Calcium-LSX zeolite [36] and Lithium-H-LSX [37] in cartridge form. Each zeolite is formed into individual rectangles for ease of manufacture and easy replacement. Each zeolite cartridge [36 and 37] will have the equivalent height of the width of the intake pipe that air will be entering the zeolite container or the maximum height that a rectangle would fit inside the given container. These two zeolite cartridges [36 and 37] will each be equal length and each half the length of the container resulting in the zeolite cartridges together reaching from end to end of the container. Between these two zeolite cartridges is a (fiber or aluminum) mesh and on the top and the bottom are a u-shaped piece of support material (plastic) [34 and 35] keeping the two together and no gaps between them. Also, because the zeolite cartridges can't be supported by nothing (because they'd fall), so there are four supports [38, 39, 40, 41] keeping the zeolite cartridges aligned within the canister and allows for proper evacuation of oxygen enrichment. The supports will match the contours of the container. These supports will also keep the container in place (because it is two top-bottom halves), in which there are screws not shown in the figures allowing for each half to be pulled off if the supports are unscrewed as well as allow for easy replacement of the zeolite cartridges if necessary.

In further detail, still referring to the invention of FIG. 1 to FIG. 2, in an oxygen enrichment device where it is attached to an intake manifold supply [12], nitrogen is constantly being filtered. There is a limit to how much nitrogen a zeolite filter can hold at one time. Nothing has infinite storage capacity. If there is lots of nitrogen in the filter, less nitrogen will be absorbed. This invention provides a solution to this problem so an oxygen enrichment system can work better and more efficiently.

In this system, two vacuum pipes [4 and 5] are attached with clamps, where there are two metal cutouts in the filter. To make you understand, the zeolite is surrounded by metal. Those vacuum pipes [4,5] are is not inside the zeolite, but rather touching it. In this design, each vacuum pipe has its own vacuum source. This vacuum source will be powered either mechanically by the engine or electronically by the battery (preferably by the battery) and controlled by the ECU (engine control unit) [10]. This vacuum will then turn on when the engine is off or idle, which will be controlled by the ECU [10]. During braking, the engine will shut off and be able to be started up again once you put your foot on the accelerator. The vacuum pump [1] will start and keep running until the engine is started again. This technology will keep the oxygen enrichment system run smoother, more reliable, and more efficiently than without it because the zeolite filter will not be clogged (or filled) with nitrogen and will run at peak nitrogen absorption performance. On each side of the filter are vacuum tubes [4 and 5] which are attached to a high pressure vacuum pimp [1] vacuum motor. This allows nitrogen to go free outside from an opening out the other side of the vacuum motor. This engine will also have a speed sensor where information is fed to the ECU [10] to see if the car is moving or not. If the engine is on but the automobile is at idle or off, the vacuum pump [1] will turn on and clean the zeolite filter releasing the nitrogen to the atmosphere.

In further detail, still referring to the invention of FIG. 1 to FIG. 2, in an internal combustion engine, sometimes it is not necessary to have the air oxygen enriched, especially in larger engines. With this new wastegate [45] design, it is possible to reduce fuel consumption of the engine during low power demand situations. This wastegate also allows for the zeolite filtration to be desorbed during situations where the oxygen enrichment system is not in use, such as when the engine is off or idle.

The intake manifold supply [12] will split and form two pipes. Each pipe will contain a valve [13 and 14] which will either be open or closed. Both valves [13 and 14] will be closed until the engine is started up, which will be determined by the ECU [10]. When started up, only one valve will be open, both cannot be open. Both of these pipes will eventually come together to form one pipe. One of these pipes will contain the complete oxygen enrichment system and the other will just contain a particle filter [21] and nothing else. These valves [13 and 14] will be controlled by the ECU to open or close.

Referring to FIG. 1 and FIG. 2, this embodiment of the invention comprises slide action valves [13, 14, 21, and 22]. These valves would be controlled by actuators [15, 16, 22, and 24] around which the maximum extent of the valve when the valve is open would be determined. The valve [13, 14, 21, and 22] would match the curvature of the pipe and would completely block airflow to the pipe when closed and allow air to flow in when open. When the engine is idle, the wastegate [45] will block the zeolite filter and allow it to clean and instead open the regular intake pipe when the engine is idle to save fuel and also allow the zeolite to be cleaned of nitrogen in the process. The valves [13, 14, 21, and 23] are powered by a vacuum that is told by the ECU [10] to turn on or off to open and close the valves [13, 14, 21, and 23]. This will be determined by the ECU [10] which will monitor if the engine is on or if the car is not moving. Also, if the ECU [10] has detected failure in the oxygen enrichment system (either no oxygen enrichment or failure from air to come through filter or whatever else), the wastegate will open the regular intake pipe and the engine will operate that way. In a different embodiment of the invention there can also be an option for either oxygen enrichment or no oxygen enrichment at the press of a button in an automobile.

Besides the two valves [13 and 14] that are used for either oxygen enrichment or no oxygen enrichment, there are two other valves (for creating a chamber vacuum) [21 and 23]. The two other valves [21 and 23] function and operate the exact same way as the other two valves [13 and 14], except that they both closed or open at the same time. One of the valves [21] is behind the oxygen enrichment container and one of them is in front [23]. They are as close to the container as possible because the purpose of it is so that when the zeolite cleaning system turns on, both valves are closed to allow a vacuum within the container so more nitrogen can be absorbed from the zeolite without pressure interferences that result in more time needed to absorb the nitrogen from the filters and less nitrogen absorbed.

Further, the vacuum consists of two parts, a high pressure vacuum pump [1] and a low pressure vacuum pump [2]. The high pressure vacuum [1] is for the zeolite cleaning system and will use two vacuum tubes [4 and 5]. The low pressure vacuum [2] is for the slide action valve actuators [15, 16, 22, and 24] and will use four small vacuum tubes [6, 7, 8, and 9]. Apart from the tubes themselves, there will be a system controlled by the ECU [10] that will consist of on/off sensors [27, 28, 29, 30, 31, 32] that control on/off switches in the ECU [10] that activate each vacuum tube when it is the right time for that particular vacuum tube to be off or on.

Pertaining to the electric motor [3] powering the high pressure vacuum pump [1] and the low pressure vacuum pump [2], there will be a power distribution system [43]. The reason for this system is that there will be dual action electric motor [3] powering both vacuum pumps [1 and 2] for cost and practicality reasons. The ECU [10] will monitor the usage of power from the two vacuum pumps [1 and 2] and distribute the electrical power from the electric motor [3] to the vacuum pumps [1 and 2] when necessary. This will be accomplished by using a power distribution sensor and an electrical power distribution system. This power for the electric motor can either be produced mechanically by the engine or electrically from the main electrical source (electric is preferred in this sense because mechanically driven accessories take away power from the engine and result in less efficiency because of friction losses from the belts, which is not desired.

What is claimed is:

1. An oxygen enrichment system for an internal combustion engine, the oxygen enrichment system comprising:
    a. a zeolite filtration system;
    b. a system that desorbs nitrogen from the oxygen enrichment system when the engine is off or idle; and
    c. a wastegate system for no oxygen enrichment when the engine is idle or the oxygen enrichment system has temporarily failed;
    wherein the zeolite filtration system comprises of a zeolite filter, particle filter, and at least one forced induction device; and
    wherein the zeolite filter comprises Calcium LSX zeolite and Lithium-LSX zeolite.

2. The oxygen enrichment system according to claim 1, wherein a forced induction device is in front of the zeolite filter and one or more forced induction device is behind the zeolite filter.

3. The oxygen enrichment system according to claim 1, wherein the system that desorbs the nitrogen from the zeolite filter comprises at least one vacuum motor;
    wherein vacuum tubes are attached to the vacuum motors (s); and
    wherein the system that desorbs the nitrogen from the zeolite filter comprises at least two vacuum tubes per zeolite filter.

4. The oxygen enrichment system according to claim 3, wherein the vacuum motor(s) is powered electrically using the car battery when the engine is off and is powered mechanically through the use of an accessory belt when desorbing nitrogen from the oxygen enrichment system during engine idle.

5. The oxygen enrichment system according to claim 3, further comprising an engine control unit (ECU) that senses if the engine is either off or idle;
    wherein the ECU senses if the engine is idle by determining that the automobile is not moving; and
    wherein the ECU initiates nitrogen desorption from the oxygen enrichment system when the engine is either off or idle.

6. The oxygen enrichment system according to claim 5, wherein the wastegate system feeds intake air to the oxygen enrichment system or a regular intake pipe, the waste gate system comprising two or more valves;
    wherein the valves are slide action in operation;
    wherein each valve contains valve actuators;
    wherein the valve actuators are electrically controlled by the ECU; and
    wherein the valve actuators are powered by the vacuum motor(s).

7. The oxygen enrichment system according to claim 6, wherein the ECU comprises:
    a. a program that determines if the intake air should be fed to the oxygen enrichment system or the regular intake pipe;
        wherein the program feeds the air to the regular intake pipe if the engine is idle;
        wherein the valve is closed to allow nitrogen desorption when the engine is idle; and
        wherein the program closes the oxygen enrichment system valve to allow nitrogen desorption when the engine is off; and
    b. a program that determines if the oxygen enrichment system has failed;
        wherein the oxygen enrichment system is determined as having failed if oxygen production and purity is below a pre-programmed threshold; and wherein the air is fed to the regular intake pipe if the oxygen enrichment system fails.

8. The oxygen enrichment system according to claim 1, wherein the zeolite filtration system comprises zeolite cartridges each in a monolithic structure form;

wherein the oxygen enrichment system houses two u-shaped pieces of material and a piece of mesh to hold the zeolite cartridges together; and wherein a container comprising the oxygen enrichment system matches the contour of the zeolite cartridges.

9. The oxygen enrichment system according to claim 5, wherein the system that desorbs nitrogen comprises:

a. a set of two slide action valves that are closed when the zeolite filtration system is being desorbed of nitrogen and open when the zeolite filtration system is producing oxygen; and b. a dual action electric motor where power is distributed to a high pressure vacuum pump and a low pressure vacuum pump;

wherein a series of sensors attached to the ECU senses the amount of power used by the high pressure vacuum pump and the low pressure vacuum pump to distribute the electric power of the electric motor accordingly; and wherein the electric motor for the high and/or low pressure vacuum pump is powered either mechanically from the engine using accessory belts or electrically from an electrical source.

10. The oxygen enrichment system according to claim 9, further comprising a program that controls when both slide action valves are open or closed depending on if the zeolite filtration system is being desorbed;

wherein a set of inputs from on/off sensors control an on/off switch for each vacuum tube; and wherein each vacuum tube is turned on or off as controlled by the ECU.

* * * * *